(12) United States Patent
Lantz et al.

(10) Patent No.: US 7,864,653 B2
(45) Date of Patent: Jan. 4, 2011

(54) PROBE STORAGE DEVICE

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/955,556

(22) Filed: Dec. 13, 2007

(65) Prior Publication Data

US 2009/0154327 A1 Jun. 18, 2009

(51) Int. Cl.
*G11B 9/00* (2006.01)
(52) U.S. Cl. ...................................... 369/126
(58) Field of Classification Search ................. 369/126; 365/145; 977/943, 947
See application file for complete search history.

(56) References Cited

U.S. PATENT DOCUMENTS

| | | | |
|---|---|---|---|
| 4,829,818 A * | 5/1989 | Bohrer ..................... 73/204.22 |
| 5,009,473 A | 4/1991 | Hunter et al. |
| 5,834,864 A * | 11/1998 | Hesterman et al. .... 310/40 MM |
| 5,986,381 A | 11/1999 | Hoen et al. |
| 6,501,210 B1 | 12/2002 | Ueno |
| 6,583,524 B2 | 6/2003 | Brandt |
| 6,639,313 B1 | 10/2003 | Martin et al. |
| 6,911,667 B2 | 6/2005 | Pichler et al. |
| 6,953,985 B2 | 10/2005 | Lin et al. |
| 6,969,635 B2 | 11/2005 | Patel et al. |
| 7,132,721 B2 | 11/2006 | Platt et al. |
| 7,372,025 B2 | 5/2008 | Hoen et al. |
| 2003/0057803 A1 | 3/2003 | Hartwell |
| 2004/0245462 A1 * | 12/2004 | Binnig et al. ............... 250/306 |
| 2007/0268099 A1 | 11/2007 | Jeong et al. |

OTHER PUBLICATIONS

J. Fernando Alfaro and Gary K. Fedder, Actuation for Probe-Based Mass Data Storage, in Technical Proceedings of the Fifth International Conference of Modeling and Simulation of Microsystems (MSM '02), Apr. 22-25, 2002, pp. 202-205, San Juan, Puerto Rico.
Y. Lu et al., Design, Fabrication and Control of a Micro X-Y Stage with Large Ultra-thin Film Recording Media Platform, Proceedings of the 2005 IEEE/ASME International Conference on Advanced Intelligent Mechatronics, Jul. 2005, p. 19-24, Monterey.
Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.

* cited by examiner

*Primary Examiner*—Jason C Olson
*Assistant Examiner*—Nicholas Lee
(74) *Attorney, Agent, or Firm*—Cantor Colburn LLP; Stephen Kaufman

(57) ABSTRACT

A probe storage device includes a scanner chip having at least a suspension layer and a table layer an array chip, and at least one coil mounted to the scanner chip. The probe storage device further includes a top plate mounted proximate to the table layer. The top plate includes at least one magnet positioned adjacent the at least one coil. A base plate is mounted proximate to the suspension layer and includes at least one magnet positioned adjacent to the at least one coil. An electronic component mounting cavity is formed in one of the table layer, suspension layer, at least one top plate and base plate. An electronic component is mounted within the electronic component mounting cavity. The electronic component is wired directly to the scanner chip to provide a direct wired connection to that eliminates the need for a printed circuit board.

4 Claims, 2 Drawing Sheets

PROBE STORAGE DEVICE

BACKGROUND OF THE INVENTION

1. Field of the Invention

This invention relates to the art of probe storage devices and, more particularly, to a scanner chip for a probe storage device.

2. Description of Background

Parallel probe-based data-storage systems are currently being developed for future data-storage applications. A parallel probe-based system employs a large array of atomic-force microscopic probes that read, write and erase data on a storage medium carried by an X/Y scanning system. The large array of probes enables very high storage densities to be achieved. Moreover, by operating the array of probes in parallel, high data transfer rates are also achievable. The high storage capacity, combined with the rapid transfer rates, enables the storage system to be built into a small package that is ideal for mobile storage applications.

Mobile storage applications present a variety of engineering challenges. First, mobile storage systems must be robust against vibration and shock. Second, mobile storage system must be capable of operating on a restricted power budget. A mobile storage system should be capable of maintaining sub-nanometer tracking performance while being subjected to mechanical shocks that create accelerations approaching 10s of g's. However, making a mechanical device more robust, i.e., capable of withstanding high accelerations, typically requires making components stiffer. By making the components stiffer, power consumption for certain components, e.g., actuators, increases and the device is less suitable for mobile applications. In addition, probe storage systems and, in particular, probe storage systems destined for mobile storage applications, must be designed to be compact, i.e., capable of being housed in a small package. That is, size must be taken into consideration when designing components for a mobile storage device, so that the probe storage system can be contained within as small a package as possible while still providing a system that is robust, possesses fast data retrieval times and high capacity.

SUMMARY OF THE INVENTION

The shortcomings of the prior art are overcome and additional advantages are provided through the provision of a probe storage device constructed in accordance with an exemplary embodiment of the present invention. The probe storage device includes a scanner chip having at least a suspension layer, a table layer and an array chip. At least one coil is mounted to the scanner chip. The probe storage device further includes a top plate mounted proximate to the table layer. The top plate includes at least one magnet spaced from, and aligned with, the at least one coil. A base plate is mounted proximate to the suspension layer. The base plate includes at least one magnet spaced from, and aligned with, the at least one coil. At least one electronic component mounting cavity formed in at least one of the table layer, suspension layer, top plate and base plate. At least one electronic component is mounted within the at least one electronic component mounting cavity. The at least one electronic component is wired to at least the array chip thereby eliminating any need for a printed circuit board.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
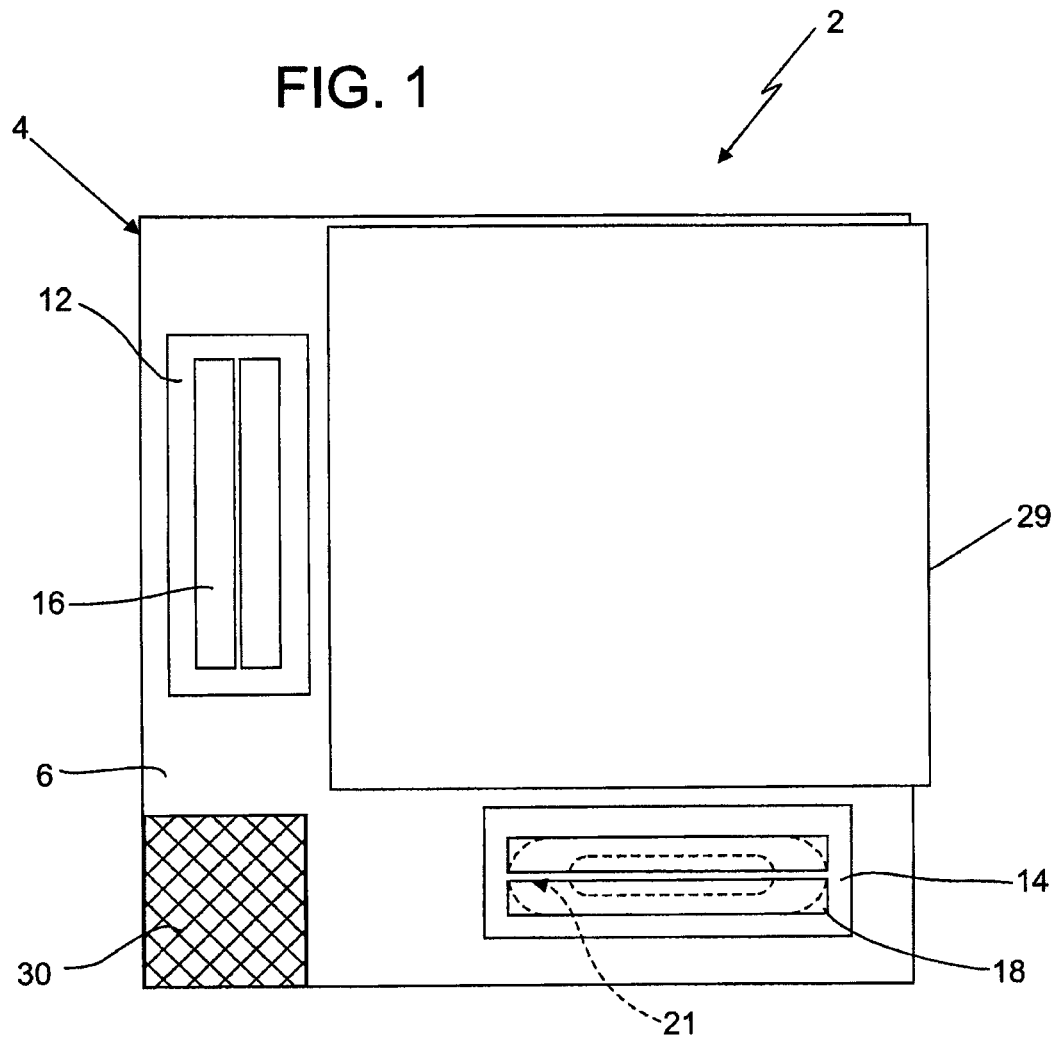
FIG. 1 is a plan view of a probe storage device constructed in accordance with an exemplary embodiment of the present invention.
Figure 2:
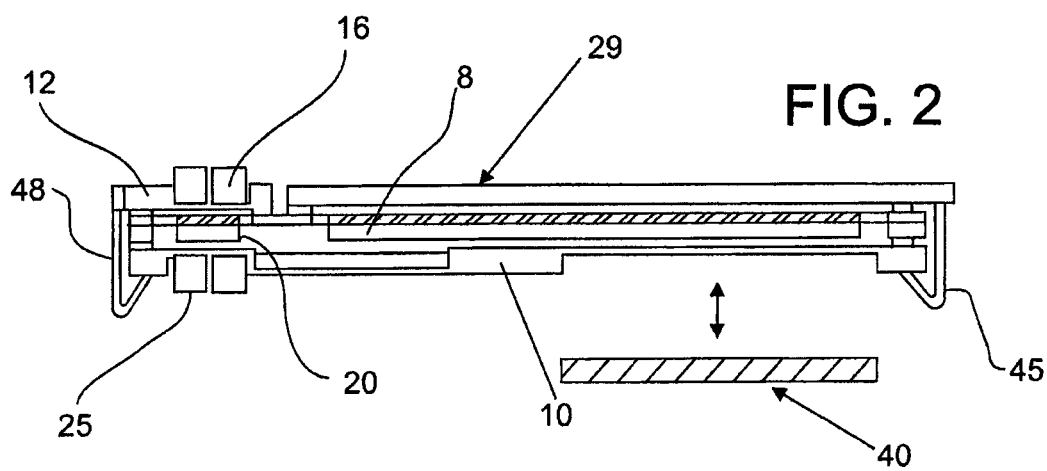
FIG. 2 is a cross-sectional side view of the probe storage device of FIG. 1.

With initial reference to FIGS. 1 and 2, a probe storage device, constructed in accordance with an exemplary embodiment of the present invention, is generally indicated at 2. Probe storage device 2 includes a scanner chip 4 having a table layer 6, a suspension layer 8 and a base plate 10. Scanner chip 4 is also shown to include first and second top plates 12 and 14, each of which houses a corresponding magnet 16 and 18. Magnets 16 and 18 are spaced from and aligned with a first surface (not separately labeled) of corresponding first and second coils 20 and 21. In addition to magnets 16 and 18 located in respective ones of top plates 12 and 14, base plate 10 also includes a pair of magnets 25 and 26 (see FIG. 3). Magnet 25 is spaced from and aligned with a second surface (not separately labeled) of first coil 20, while magnet 26 is spaced from and aligned with a second surface (not separately labeled) of second coil 21. Scanner chip 4 is also shown to include a scan table 28 that is operatively connected to first and second coils 20 and 21. Scanner chip 4 is also shown to include an array chip 29 that is spaced from and aligned with scan table 28. Array chip 29 includes a plurality of probes (not shown) for reading and writing data. Scanner chip 4 is further shown to include a scan table driver chip 30 positioned in an electronic component mounting cavity 32, an electronic component that selectively activates first and second coils 20 and 21 to move scan table 28 along first and second orthogonal axes that define an X/Y plane.

In accordance with an exemplary embodiment of the present invention, illustrated in FIG. 2, base plate 10 include a first electronic component mounting cavity 34 within which is positioned a complementary metal-oxide-semiconductor or CMOS chip 40. CMOS 40 is an active component and serves as an interface between array chip 29 and a host device for probe storage device 2. Towards that end, CMOS 40 is electrically connected to base plate 10 through a plurality of bonding wires, one of which is indicated at 45. Similarly, scan table driver chip 30 is electrically connected to base plate 10 through a corresponding at least one bonding wire 48. That is, base plate 10 is formed with one or more wiring levels that enable various components to be directly electrically interconnected without increasing an overall thickness of scanner chip 4.

Figure 3:
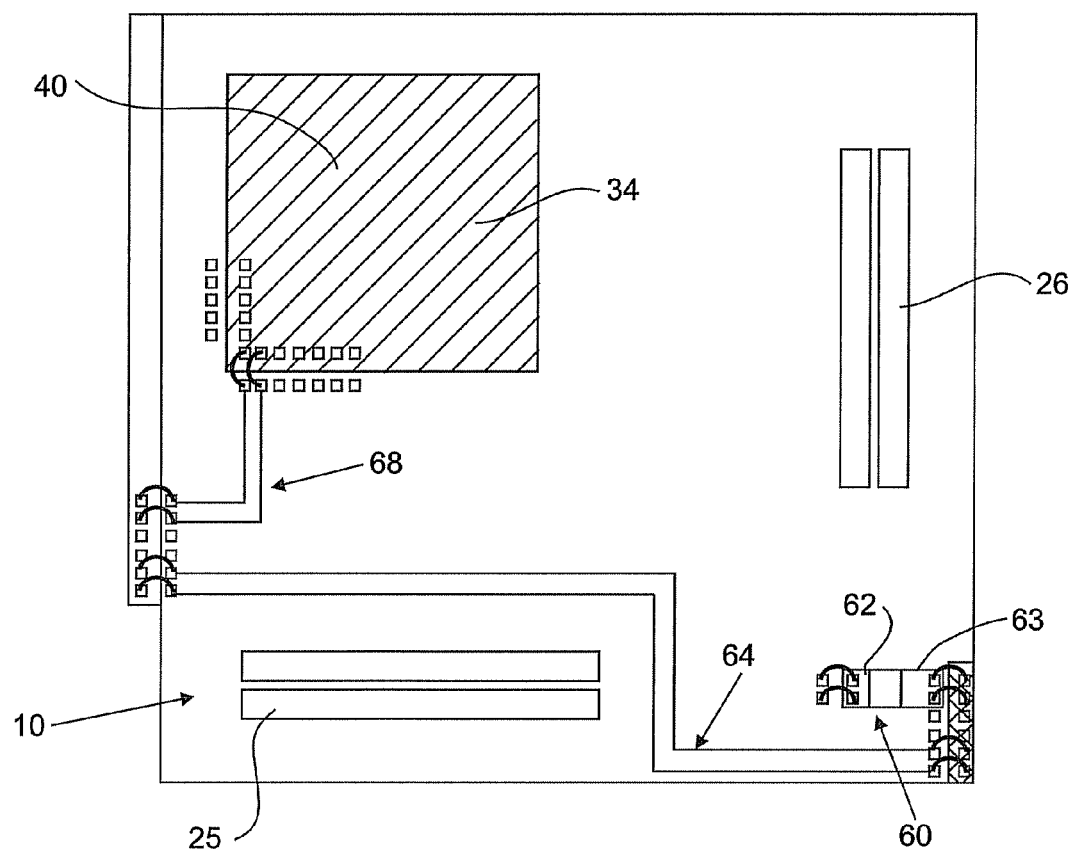
FIG. 3 is a bottom plan view of the probe storage device of FIG. 1.

In accordance with another aspect of the exemplary embodiment of the present invention illustrated in FIG. 3, a second electronic component mounting cavity 60 is formed in base plate 10. Second electronic component mounting cavity 60 provides a mounting interface for additional electronic components 62 and 63. A first set of wiring leads 64 is formed on base plate 10 and provides a connection for scan table driver chip 30 and components 62 and 63 (connection to wiring leads 64 and components 62 and 63 not shown). Similarly, a second wiring level 68 is formed in base plate 10 and provides additional connection points for CMOS chip 40. With this arrangement, electronic components 62 and 63 which could be either active or passive, are mounted to base plate 10 without appreciably increasing an overall thickness of probe storage device 2. That is, by providing first and second cavities 34 and 60 on base plate 10 and second cavity 32 on table layer 6, electronic components associated with the operation of probe-storage device 2 are more compactly integrated into a single, small form factor assembly that eliminates the need for a separate printed circuit board (PCB). At this point it should be appreciated the electronic component mounting cavities can also be formed in the top plates, the table layer, the suspension layer or other parts to the probe storage device depending upon the particular configuration employed and the need for incorporating addition electronic components without using a PCB. In any event, with this construction, probe storage device 2 is readily configurable so as to be incorporated into a smaller package that is particularly suited for mobile storage applications. Of course, probe storage device 2 can be employed in a wide variety of data storage applications and should not be seen as being limited to mobile storage applications.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A probe storage device comprising:
   a scanner chip including at least a suspension layer, a table layer and an array chip;
   at least one coil mounted to the scanner chip;
   a top plate mounted proximate to the table layer, the top plate including at least one magnet spaced from and aligned with the at least one coil;
   a base plate mounted proximate to the suspension layer, the base plate including at least one magnet spaced from and aligned with the at least one coil;
   first and second electronic component mounting cavities, the first electronic component mounting cavity being formed in the base plate and the second electronic component mounting cavity being formed in the table layer; and
   at least one electronic component mounted within one of the first and second electronic component mounting cavities, the at least one electronic component being wired directly to the array chip, wherein mounting the at least one electronic component in the one of the first and second mounting cavities provides a direct wired connection to the array chip establishing a probe storage device without a printed circuit board.

2. The probe storage device according to claim 1, wherein the base plate includes at least one wiring level.

3. The probe storage device according to claim 1, wherein the at least one electronic component includes a first electronic component mounted in the first electronic component mounting cavity and a second electronic component mounted in the second electronic component mounting cavity.

4. The probe storage device according to claim 3, wherein the first electronic component is an active electronic component and the second electronic component is a passive electronic component.

* * * * *